United States Patent Office 3,533,795
Patented Oct. 13, 1970

3,533,795
BASE FILM WITH IMPROVED SCRIBE COATING AND PHOTOSENSITIVE COATING APPLIED THEREON
Freimuth Blaumueller, Chicago, Ill., assignor to Eugene Dietzgen Co., Chicago, Ill., a corporation of Delaware
No Drawing. Filed Aug. 24, 1966, Ser. No. 574,577
Int. Cl. G03c 1/94
U.S. Cl. 96—87                                                5 Claims

ABSTRACT OF THE DISCLOSURE

A polyethylene terephthalate base film is coated with a composition containing a crosslinkable acrylic polymer and inert pigment or filler, to which other resin may be added. After heating to crosslink the acrylic polymer, a hydrophilic coating and then a final, photosensitive coating are applied thereover.

---

The present invention relates to a drafting medium which is intended for use where extremely high accuracy and precision are desired. More particularly, the invention is directed to a scribe film or coat for producing precise maps and undimensioned drawings where the drawing is used as a full size template of the article drawn.

Scribe film is used for a variety of purposes. In the aircraft industry, for example, full scale drawings can be made on the film which are then reproduced on actual construction materials such as aluminum and magnesium, etc., to form templates or patterns. Scribe film is also often used in producing maps.

The base materials that have been used most often in recent times for forming a scribe film include impregnated woven glass cloth and polyester film. The base is coated with a material that can be removed with a scribing tool. In U.S. Pat. 2,999,016 dimensionally stable materials for these purposes are described in which the coating is based on oil-modified glycerol phthalate resins, nitrocellulose and pigment. These materials, however, are known to harden with age and thus become unsuitable for scribe after a time.

The principal object of the present invention is to provide a novel scribe coat which does not harden on storage, but which has all of the other desirable properties of the known scribe materials.

Another object of the invention is to provide improved photosensitive coatings over the scribing surface.

Other objects will become apparent to those skilled in the art from the following detailed description of the invention.

In general, the present invention comprises the discovery of a scribe coat which is opaque to actinic light but which does not harden with age, that is, which does not undergo subsequent polymerization. The subject scribe coat contains acrylic resin solids having reactive hydroxyl, carboxyl or amide groups which are capable of being crosslinked to form a stable thermoset polymer. The scribe coat also contains a crosslinking agent, an acid catalyst, and nitrocellulose solids, the function of which is to lower cohesion.

The subject scribe coat is particularly adaptable for mapping work. The desired image is drawn on the polyester film by removing the coating accurately with a scribing tool, e.g., carbide or sapphire stylus. By this means consistent line widths are maintained. The ultimate drawing produced is a negative. This material can also be photosensitized with conventional photosensitive material, such as diazo, iron or silver salts or wash-off, which is a tannable colloid system. Thus, when a photosensitized scribe material is exposed to an aerial photographic negative, for instance, a reproduction is obtained which provides the guidelines to be scribed.

The dimensionally stable base is generally a polyester film such as polyethylene terephthalate. Film of linear polyethylene terephthalate resins, such as "Mylar" marketed by the E. I. du Pont de Nemours Co., are biaxially oriented and, therefore, provide an excellent dimensionally stable base. In addition, this type of film provides good light transmission and flexibility.

The reactive acrylic resins which are used in producing the intermediate coating are well known in the art. These materials are acrylic ester or methacrylic ester copolymers or terpolymers having reactive hydroxyl, carboxyl or amide groups. The reactive hydroxyl, carboxyl or amide groups are capable of being crosslinked to form a stable thermoset polymer. One such product is sold under the trademark Interchemical NVV–54–212. Another is sold under the trademark Rohm & Haas QR–446I. The present invention contemplates the use of any of the reactive acrylic acid or methacrylic acid copolymers or terpolymers. These reactive acrylic resins include water soluble types such as copolymers of unsaturated monocarboxylic acids and alkyl esters of such acids—e.g., acrylic acid and butyl acrylate (see, for example, U.S. Pat. 2,906,724), solvent-soluble acrylic copolymers or terpolymers containing reactive groups, as well as acrylic latex systems.

The crosslinking agents which are used in preparing the subject scribe coating material include all of the known crosslinking agents for reactive acrylic resins. A crosslinking agent which has proven to be especially advantageous is hexamethoxymethylmelamine. As is known in the art, the crosslinking reaction merely requires the presence of an acid catalyst such as trifluoroacetic acid.

In one embodiment of the invention the polyester film is provided with a pencil and ink receptive surface suitable for drawings made in the usual manner on tracing base, e.g., paper or cloth. A considerable amount of pigment is incorporated into the coating to make it receptive to pencil and ink impressions. The pigment should be opaque to actinic light for photographic purposes.

The scribe coatings of reactive acrylic resin, which are applied to the polyester film, contain high proportions of inert pigments, fillers and/or dyes to produce the desired degree of visual or actinic opacity, as well as to reduce the cohesion forces of the acrylic resin. Opaque pigments such as titanium dioxide are particularly suitable for this purpose. Inert fillers, such as $SiO_2$ may also be incorporated to lower the cohesion of the acrylic resins which improves the cutting characteristics of the scribe coating. Aluminum silicate may also be added to lower the cohesion of the acrylic resin. Colored pigments such as carbon black, chrome yellow or molybdate orange or suitable dyes may be added to obtain the desired colored coating. On the other hand if a transparent scribe coating is preferred only a dye opaque to actinic light should be used. Likewise, additives should be used which do not adversely affect the transparency.

Other resins may be added to the scribe coatings. For example, nitrocellulose may be used to give the coatings sufficient hardness and to lower the cohesion of the acrylic resin. The amount of nitrocellulose which may be tolerated can be as high as 75% of the resin content if the other ingredients are properly balanced or if plasticizers are also added.

The following is a typical example of a suitable coating having excellent scribing properties. It is not intended, however, that the scope of the invention be so limited.

EXAMPLE 1

| | G. |
|---|---|
| Titanium dioxide | 150 |
| Silicone dioxide | 20 |
| Aluminum silicate | 22 |
| Nitrocellulose | 2.5 |
| Acryloid F–10 (Rohm & Haas) | 4.8 |
| Acryloid QR–446I (Rohm & Haas) | 35 |
| Hexamethoxymethylmelamine | 5 |
| Trifluoroacetic acid | 10 |
| Solvents | 800 |

In the above list of materials, Acryloid F–10 was used as a resin modifying agent. This is not a reactive resin of the type represented by Acryloid QR–446I. The solvents may be selected from suitable esters, ketones and the like, such as butyl acetate, ethyl acetate and methyl ethyl ketone. The proportion of solids to solvents may be varied depending upon the manner of application of the coating. The above formulation was designed for meniscus application, but it may also be applied by roller coating, spray, etc. The coating is applied directly on the polyethylene terephthalate film (Mylar). A coating thickness of .0006 inch was obtained. The coating thickness of the scribe coating should be such that the coating is actinically opaque, yet has sufficient white light translucency so that it can be seen through when placed on a light table. A coating thickness of .0006 inch has been found to be suitable. The coated film was then placed in an oven, maintained at a temperature of 260°–275° F., where the solvent was driven off and where crosslinking occurred between the reactive acrylic resin and a crosslinking agent such as hexamethoxymethylmelamine. The acrylic resins used in the example contain reactive carboxyl and/or hydroxyl groups which react with the hexamethozymethylmelamine when acid catalyzed when a temperature of 250°–300° F. is reached. For optimum results, the ratio of acrylic resin solids to hexamethoxymethylmelamine should be from 4:1 to 5:1. If this curing step is completed soon after coating, the scribing characteristics of the coating will not change with time. The crosslinking reaction ties up all the existing reactive sites and provides a completely polymerized system.

Conventional photosensitive material such as diazo, iron or silver salts or wash-off, which is a tannable colloid system, may be applied to the crosslinked system. An image can then be reproduced on top of the scribe coating and all or part of it cut into the scribe layer with a proper tool. For example, when a photosensitized scribe material is exposed to an aerial photographic negative, a reproduction is obtained which provides guidelines to be scribed.

EXAMPLE 2

The following is an example of a hydrophilic coating that can be applied over the scribable coating which will allow the product to accept an aqueous-base photosensitive coating:

| Hydrophilic coating: | Grams |
|---|---|
| Water-soluble protein (Borden-Protovec) | 10 |
| Cab-O-Sil | 1 |
| Wetting agent | .25 |
| Acrylic emulsion | 5 |
| Water | 75 |

A diazo type coating, for example, can then be applied to this pretreated scribe layer.

Obviously many modifications and variations of the invention set forth may be made without departing from the spirit and scope therefore only such limitations should be imposed as are indicated in the appended claims.

I claim:
1. A process for producing a dimensionally stable scribe coating system which comprises: applying directly to a base film of oriented polyethylene terephthalate a solution comprising a reactive acrylic polymer containing reactive hydroxyl, carboxyl or amide groups, an actinic light opaquing material, an inert filler, a crosslinking agent and a solvent; and heating the system to a temperature between 250° F. to 300° F. to drive off said solvent and to crosslink said reactive acrylic polymer.

2. A process for producing a dimensionally stable scribe coating system which comprises: applying directly to a base film of oriented polyethylene terephthalate a solution comprising a reactive acrylic polymer containing reactive hydroxyl, carboxyl or amide groups, an actinic light opaquing material, an inert filler, a crosslinking agent and a solvent; heating the system to a temperature between 250° F. to 300° F. to drive off said solvent and to crosslink said reactive acrylic polymer, applying a hydrophilic coating over the resulting crosslinked thermoplastic acrylic polymer, and thereafter coating the system with a photosensitive material.

3. A process for producing a dimensionally stable scribe coating system which comprises: applying directly to a base film of oriented polyethylene terephthalate a solution comprising a solvent-soluble acrylic acid copolymer or terpolymer containing hydroxyl, carboxyl or amide reactive groups, an actinic light opaquing material, an inert filler, a crosslinking agent and a solvent; heating the system to a temperature between 250° F. to 300° F. to drive off said solvent and to crosslink said reactive acrylic polymer, applying a hydrophilic coating over the resulting crosslinked thermoplastic acrylic acid copolymer or terpolymer, and thereafter coating the system with a photosensitive material.

4. A process for producing a dimensionally stable scribe coating system which comprises: applying directly to the base of an oriented polyethylene terephthalate a solution comprising a reactive acrylic acid-butyl acrylate copolymer, titanium dioxide, $SiO_2$, hexamethoxymethylmelamine, and a solvent, the ratio of copolymer to hexamethoxymethylmelamine being from 4:1 to 5:1, and heating the system to a temperature between 250° F. and 300° F. to drive off said solvent and to crosslink said reactive copolymer.

5. A dimensionally stable scribe system with improved aging characteristics comprising: a base film of oriented polyethylene terephthalate; an adherent coating comprising a crosslinked thermoset acrylic polymer, said polymer being a copolymer of an unsaturated monocarboxylic acid and an alkyl ester; silicone dioxide and titanium dioxide intimately mixed into said coating; a hydrophilic coating applied over said adherent coating; and a final coating over said hydrophilic coating, said final coating containing a photosensitive material selected from the group consisting of silver salts, iron salts, diazo compounds and tannable colloids.

References Cited

UNITED STATES PATENTS 2,999,016  9/1961  Beeber et al. _____ 96—87
Re. 22,402  12/1943  Swain et al. _____ 96—87

OTHER REFERENCES

Chemical abstracts vol. 63, 1965. P. 18466f, article by Cohen et al.

DAVID KLEIN, Primary Examiner